United States Patent
Botura et al.

(10) Patent No.: US 12,492,003 B2
(45) Date of Patent: Dec. 9, 2025

(54) INTEGRATED ICE PROTECTION WITH PROGNOSTICS AND HEALTH MANAGEMENT

(71) Applicant: Goodrich Corporation, Charlotte, NC (US)

(72) Inventors: Galdemir Cezar Botura, Akron, OH (US); Casey Slane, Tallmadge, OH (US); Brandon Hein, Stow, OH (US); Peter J. Carini, Underhill, VT (US)

(73) Assignee: GOODRICH CORPORATION, Charlotte, NC (US)

( * ) Notice: Subject to any disclaimer, the term of this patent is extended or adjusted under 35 U.S.C. 154(b) by 177 days.

(21) Appl. No.: 17/459,168

(22) Filed: Aug. 27, 2021

(65) Prior Publication Data
US 2023/0066407 A1    Mar. 2, 2023

(51) Int. Cl.
*B64D 15/20*    (2006.01)
*B64D 45/00*    (2006.01)
(Continued)

(52) U.S. Cl.
CPC ............. *B64D 15/20* (2013.01); *B64D 45/00* (2013.01); *B65D 43/00* (2013.01); *G01D 9/28* (2013.01); *G01D 21/00* (2013.01); *G02B 6/12* (2013.01); *B64D 2045/0085* (2013.01); *G01D 2207/10* (2021.05); *G02B 2006/12138* (2013.01)

(58) Field of Classification Search
CPC .. G02B 2006/12138; G02B 6/12; G01D 9/28; G01D 2207/10; G01D 21/00; B64D 15/20; B64D 45/00; B64D 2045/0085; B65D 43/00
See application file for complete search history.

(56) References Cited

U.S. PATENT DOCUMENTS 4,996,419 A * 2/1991 Morey ............... G01L 1/246
                                                 250/227.18
5,182,449 A * 1/1993 Johnson ............. G01L 1/247
                                                 250/227.14
(Continued)

FOREIGN PATENT DOCUMENTS

CN    112697055 A    4/2021

OTHER PUBLICATIONS

European Search Report for Application No. 22188835.7, mailed Jan. 3, 2023, 11 pages.

*Primary Examiner* — Pranesh K Barua
(74) *Attorney, Agent, or Firm* — CANTOR COLBURN LLP

(57) ABSTRACT

Provided are embodiments for method and system for performing an integrated ice protection with prognostics and health management using fiber optic sensors. Embodiments can include reading a signal from each sensor of an array of sensors installed on a surface of a structure or equipment, wherein each sensor is a fiber optic sensor, and generating a map based on reading the signal from each sensor, wherein the map monitors a condition of the surface detected by each sensor. Embodiments can also include determining at least one of an abnormal condition or a failure based at least in part on reading the signal from each sensor; and performing at least one of adjusting power control for the structure or equipment or communicating the abnormal condition or failure of the structure or equipment.

15 Claims, 4 Drawing Sheets

(51) Int. Cl.
  *B65D 43/00* (2006.01)
  *G01D 9/28* (2006.01)
  *G01D 21/00* (2006.01)
  *G02B 6/12* (2006.01)

(56) References Cited

U.S. PATENT DOCUMENTS

| | | | | |
|---|---|---|---|---|
| 5,874,672 | A * | 2/1999 | Gerardi | G08B 19/02 |
| | | | | 340/580 |
| 6,384,611 | B1 * | 5/2002 | Wallace | B64D 15/20 |
| | | | | 324/699 |
| 7,523,889 | B2 | 4/2009 | Bourjac et al. | |
| 7,948,147 | B2 | 5/2011 | Carralero et al. | |
| 8,462,354 | B2 * | 6/2013 | Barnes | G01B 11/24 |
| | | | | 356/601 |
| 10,112,726 | B2 | 10/2018 | Wilson et al. | |
| 10,585,006 | B2 | 3/2020 | Wilson et al. | |
| 2005/0111793 | A1 * | 5/2005 | Grattan | G01K 11/3206 |
| | | | | 374/E11.016 |
| 2009/0306928 | A1 * | 12/2009 | Battisti | F03D 80/40 |
| | | | | 702/136 |
| 2010/0155539 | A1 * | 6/2010 | Press | B64D 15/20 |
| | | | | 244/134 R |
| 2014/0191084 | A1 * | 7/2014 | Gambino | B64D 15/12 |
| | | | | 244/134 D |
| 2016/0009400 | A1 * | 1/2016 | English | B64D 15/20 |
| | | | | 62/139 |
| 2016/0257414 | A1 * | 9/2016 | Clemen, Jr. | B64D 15/20 |
| 2017/0334574 | A1 * | 11/2017 | Wilson | H04J 14/0227 |
| 2019/0285487 | A1 | 9/2019 | Seeley | |

* cited by examiner

INTEGRATED ICE PROTECTION WITH PROGNOSTICS AND HEALTH MANAGEMENT

BACKGROUND

The present invention relates to ice protection systems, and more specifically, to integrated ice protection with prognostics and health management using fiber optic sensors.

Aircraft can be exposed to weather conditions that allow ice to form on its surfaces. Ice can be formed on the surfaces of the aircraft such as the windscreen, wings, tail, and air intake components before or during flight. The build up of ice can lead to adverse operation such as blocking needed engine airflow or inhibiting the operation of the wings or other components. In addition, damage to other components and the safety of the aircraft and passengers can result. Aircraft equipped with heating components can include electric heaters to protect the aircraft. There may be a need to ensure the proper operation of the heating components over the life of the aircraft.

BRIEF DESCRIPTION

According to an embodiment, a method for operating an integrated ice protection with prognostics and health management is provided. The method can include reading a signal from each sensor of an array of sensors installed on a surface of a structure or equipment, wherein each sensor is a fiber optic sensor, and generating a map based on reading the signal from each sensor, wherein the map monitors a condition of the surface detected by each sensor. The method can also include determining at least one of an abnormal condition or a failure based at least in part on reading the signal from each sensor, and performing at least one of adjusting power control for the structure or equipment or communicating the abnormal condition or failure of the structure or equipment.

In addition to one or more of the features described herein, or as an alternative, further embodiments include using a map that is a temperature map.

In addition to one or more of the features described herein, or as an alternative, further embodiments include reading a signal that is transmitted over a fiber optic cable.

In addition to one or more of the features described herein, or as an alternative, further embodiments include using a plurality of sensors that is coupled to each fiber optic cable.

In addition to one or more of the features described herein, or as an alternative, further embodiments include arranging each fiber optic cable to monitor a zone of a structure.

In addition to one or more of the features described herein, or as an alternative, further embodiments include using a map that indicates a sensor type for each sensor.

In addition to one or more of the features described herein, or as an alternative, further embodiments include using sensor types such as temperature sensors and strain sensors.

In addition to one or more of the features described herein, or as an alternative, further embodiments include determining the health of the equipment by comparing historical readings to real-time readings for the equipment.

According to an embodiment, an integrated ice protection with prognostics and health management using fiber optic sensors is provided. The system includes a sensor array and a controller coupled to the sensor array. The controller can be to reading signals from each sensor of the sensor array installed on a surface of a structure or equipment, wherein each sensor is a fiber optic sensor, and generating a map based on reading the signal from each sensor, wherein the map monitors the surface and a condition of the surface detected by each sensor. The controller can also include determining at least one of an abnormal condition or a failure based at least in part on reading the signal from each sensor, and performing at least one of adjusting power control for the structure or equipment or communicating the abnormal condition or failure of the structure or equipment.

In addition to one or more of the features described herein, or as an alternative, further embodiments include using a map that is a temperature map.

In addition to one or more of the features described herein, or as an alternative, further embodiments include reading a signal that is transmitted over a fiber optic cable.

In addition to one or more of the features described herein, or as an alternative, further embodiments include using a plurality of sensors that is coupled to each fiber optic cable.

In addition to one or more of the features described herein, or as an alternative, further embodiments include arranging each fiber optic cable to monitor a zone of a structure.

In addition to one or more of the features described herein, or as an alternative, further embodiments include using a map that indicates a sensor type for each sensor.

In addition to one or more of the features described herein, or as an alternative, further embodiments include using sensor types such as temperature sensors and strain sensors.

In addition to one or more of the features described herein, or as an alternative, further embodiments include determining the health of the equipment by comparing historical readings to real-time readings for the equipment.

Technical effects of embodiments of the present disclosure include generating and displaying a map representing the temperature readings obtained from the plurality of sensors.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Current ice protection systems do not provide diagnostic and prognostic health monitoring management for the condition and performance of the heater components and surrounding structure. The lack of feedback indicating the performance and health of the system can lead to potential unknown areas of concern before/during/after operation which can increase the system operational cost. Also, the lack of real-time temperature mapping of the structure and heater elements hide cold or hot spots in the system causing potential hazardous for the aircraft, engine and crew during flight in icing conditions.

Conventional temperature mapping using current technologies such as resistance temperature detectors (RTDs) require numerous sensors and is limited because they can only obtain point measurements. Point measurements are limited to a particular location. This can lead to a decrease in system reliability from the many added sensors and extra electrical connections. Prognostic health management (PHM) temperature mapping with fiber optic sensors do not require as many electrical connections thus decreasing the impact to improve system reliability.

The techniques described herein integrate an array of fiber optic sensors that are arranged to cover deicing and heating components and the surrounding area in order to detect and map the surface temperature where ice protection is required. The array of fiber optic sensors can be also installed beyond the ice protected area extending its area of monitoring for detecting ice runback or ice conditions beyond of the icing protection envelope. The fiber optic sensors can also assist in power management of the ice protection system by monitoring real-time impingement limits of the protected surface. The ice protection system can be operated to adjust heater ON/OFF times or determine which zones are activated based on this feedback. These adjustments can lead to minimizing the ice protection energy usage resulting in fuel savings for conventional aircraft or extended battery life for electric aircraft. The array of fiber optic sensors can be installed in any location of the structure. The array of sensor is not limited to temperature, the sensing elements may include strain gauges for monitoring stress as well as structural or heater failure. The integration of electrical ice protection and PHM with array of fiber optic sensor can be installed in composite or metallic components.

Figure 1:
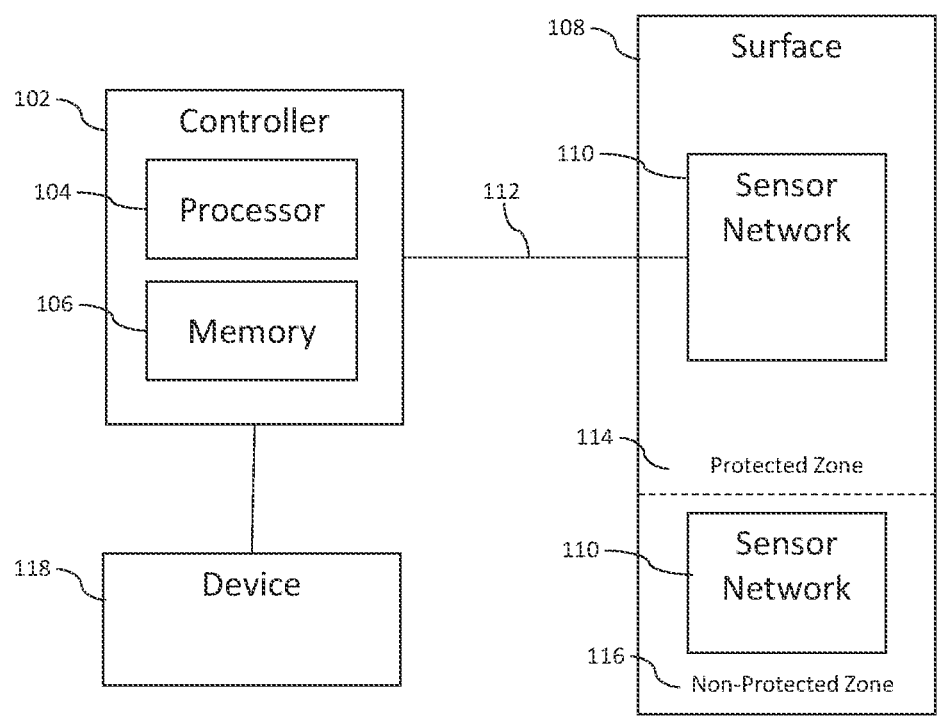
FIG. 1 depicts a block diagram of a system in accordance with one or more embodiment of the disclosure

FIG. 1 depicts a system 100 in accordance with one or more embodiments of the disclosure. The system 100 can include a controller 102. The controller 102 includes a processor 104 and a memory 106 to carry out the operations for the integrated ice protection system with prognostics and health management. It can be appreciated the controller 102 can include other components or modules and is not limited by the components shown in FIG. 1. In one or more embodiments of the disclosure, the processor 102 can include a processor 102 of a general-purpose computer, special purpose computer, or other programmable data processing apparatus configured to execute instruction via the processor of the computer or other programmable data processing apparatus.

The controller 102 is configured to monitor the surface 108 of a structure, such as an aircraft wing. The fiber optic sensors can be coupled to the controller over a plurality of fiber optic cables 112. The temperature of the surface 108 can be monitored using fiber optic sensors forming a sensor network 110. In addition, strain gauges can be used to monitor the stress or tension experienced on the surface 108. The fiber optic sensors can receive a light signal that can be converted to a digital signal either in the sensing element or at a remote processing element in the controller. Also, the fiber optic sensors do not require electric power for operation and the fiber optic sensors are not vulnerable to electromagnetic interference. This allows fiber optic sensors to be used in remote spaces without having excess wiring to power the fiber optic sensors.

In one or more embodiments, during installation of the sensors the memory 106 of the controller 102 can store the address of each of the sensors and related the address with a position/location of the sensor on the surface 108 and/or structure. Also, the memory 106 of the controller 102 can be configured with alarm limits that can be used to trigger an alert that can be transmitted to one or more connected devices.

As shown in FIG. 1, the sensor network 110 can be arranged in a protected zone 114 of the surface 108 and non-protected zone 116. In a non-limiting example, the protected zone 114 the fiber optic sensors can be arranged to monitor an area that is within proximity to a heater (not shown) for protecting the aircraft wing, and the non-protected zone 116 the fiber optic sensors can be arranged to monitor the runback of the melted ice.

The sensor network 110 can be arranged on the surface of aircraft equipment such as a heat generating equipment for protecting the aircraft and is not limited to the aircraft wing. The heating components of the aircraft can include an electric heater that converts electric energy to heat energy using a heating element. Other heating components can include embedding heating wires on various surfaces of the aircraft. The heating components can include metal heating elements formed of stainless steel, copper, wire, cloth, or other electrically conductive mediums.

In FIG. 1, the system 100 can include a device 118 for communicating with the controller 102. The device 118 can include but is not limited to a computer, laptop, user device, aircraft avionics system, or smart device. The controller 102 can be operated to communicate or transmit the abnormal readings and/or failure conditions of the surface of the structure or equipment that is being monitored. The abnormal readings can be determined based on comparing the current readings to normal or historical readings. Similarly, the failure conditions can be determined by comparing the current sensor readings to pre-determined or configurable thresholds to determine whether a failure condition exists. For example, real-time temperature readings that exceed a configurable threshold temperature can indicate a failure while increased temperature readings over normal or historical readings can indicate a trend toward the failure.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 2:
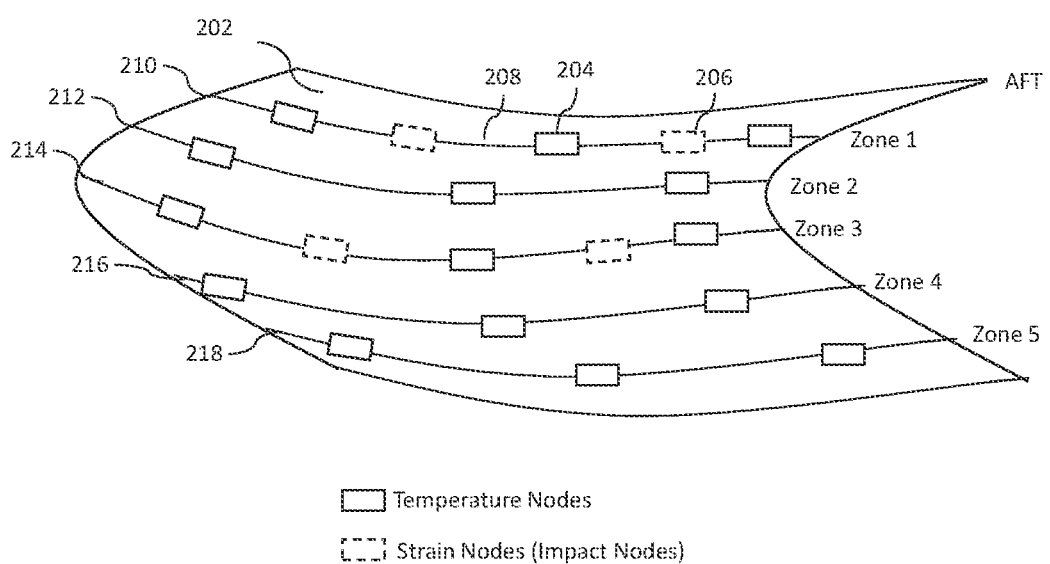
FIG. 2 depicts an example configuration of an arrangement of sensors on a surface in accordance with one or more embodiments of the disclosure.

Now referring to FIG. 2, an example arrangement of fiber optic-based sensors positioned on a surface of a portion of an aircraft wing 202 is shown. Although a controller, such as controller 102 is not shown in FIG. 2, it can be appreciated the fiber optic cables 208 are coupled to a controller to receive the signals. FIG. 2 depicts a plurality of temperature sensors 204 and a plurality strain gauge sensors 206. Each fiber optic cable 208 can include both types of sensors 204, 206 which reduces the amount of additional wires that are needed to install the different type of sensors. In one or more embodiments of the disclosure, the plurality of sensors 204, 206 is coupled to each fiber optic cable 208, and the individual readings from sensors 204, 206 on the same fiber optic cable 208 can be processed in by the controller 102 in a variety of ways. For example, the controller 102 can process each signal from corresponding sensors 204, 206 using a known time delay or wavelength. Each of the sensors 204, 206 can be associated with a particular location of the aircraft wing 202 for mapping. FIG. 2 illustrates a fixed number of sensors, however, it should be understood that any number of sensors and placement of the sensors can be used. In addition, although the arrangement of fiber optic-based sensors is on a surface of an aircraft wing 202, it can be appreciated the sensors can be placed directly on the equipment for monitoring. In the non-limiting example, the sensors 204, 206 can be arranged in a plurality of zones 210-218 of the aircraft can be used for monitoring the various zones.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 3:
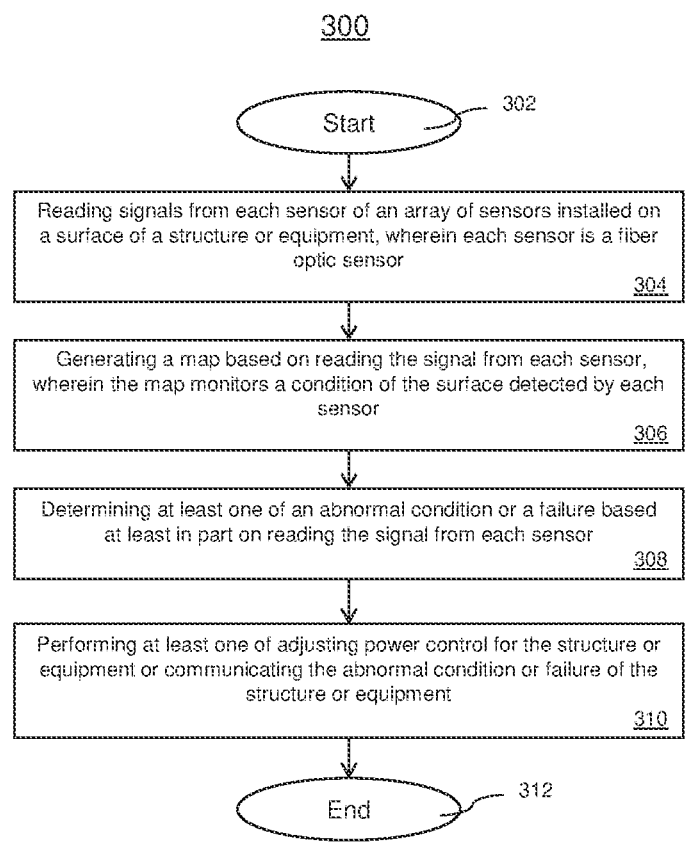
FIG. 3 depicts a flowchart of a method for generating a temperature map in accordance with one or more embodiments of the disclosure.

FIG. 3 depicts a flowchart of a method 300 for performing integrated ice protection solution with prognostics and health management in accordance with one or more embodiments of the disclosure. The method 300 can be implemented in the system such as the system 100 shown in FIG. 1 or other similar type of system. The method 300 begins at block 302 and continues to block 304 which provides for reading signals from each sensor of an array of sensors installed on a surface of a structure, wherein each sensor is a fiber optic sensor. The fiber optic sensors can include temperature sensors and strain sensors (strain gauges). Block 306 generates a map based on reading the signal from each sensor, wherein the map monitors a condition of the surface detected by each sensor. In one or more embodiments of the disclosure, the controller 102 is configured to internally update the power activation control for the structure or equipment based on sensor feedback or detects abnormal conditions based on signal readings from each sensor. Block 308 determines at least one of an abnormal condition or a failure based at least in part on reading the signal from each sensor. Block 310 performs at least one of adjusting power control for the structure or equipment or communicating the abnormal condition or failure of the structure or equipment. The method 300 ends at block 311.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 4:
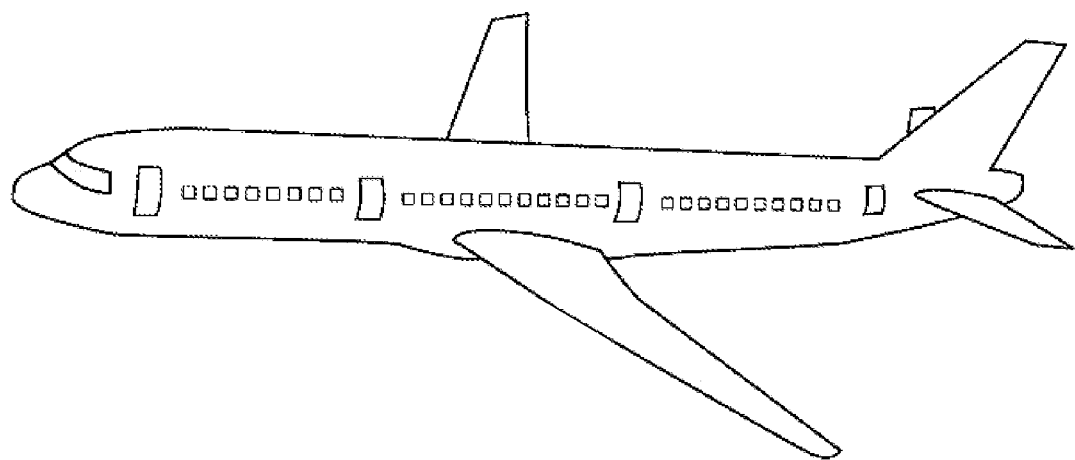
FIG. 4 depicts an example aircraft upon which the arrangement of sensors in accordance with one or more embodiments of the disclosure.

FIG. 4 depicts an example of an aircraft that is monitored in accordance with one or more embodiments of the disclosure. Although an aircraft is shown, the techniques described herein can be applied to other vehicles and is not limited by the illustration shown in FIG. 4.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

The technical effects and benefits include generating a temperature map using readings from fiber optic sensors arranged on a surface. The arrangement can expose cold spots during deicing of an aircraft. The technical effects and benefits also include obtaining real-time diagnostic features to improve power management of the system and for performing health management of the aircraft surfaces and equipment.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method comprising:
    reading, at a controller, a signal from each sensor of an array of sensors installed in a protected zone within proximity of heating equipment on a surface of an aircraft structure and in a non-protected runback zone on the surface of the aircraft to monitor runback of melted ice, wherein the runback zone is a region behind the aircraft structure where melted ice will runback during flight, wherein each sensor is a fiber optic sensor and wherein sensors in the runback zone are connected by fiber optic cables to sensors in the protected zone;
    generating a map based on reading the signal from each sensor, wherein the map monitors a condition in the protected zone and in the non-protected runback zone;
    determining at least one of an abnormal condition or a failure based at least in part on reading the signal from each sensor; and
    adjusting power control for the heating equipment based on information from sensors on the structure that are in the non-protected runback zone.

2. The method of claim 1, wherein the map is a temperature map.

3. The method of claim 1, wherein reading the signal from each sensor comprises reading the signal transmitted over a fiber optic cable.

4. The method of claim 3, wherein a plurality of sensors is coupled to each fiber optic cable.

5. The method of claim 1, wherein the array of sensors is formed by a plurality of fiber optic cables, the method further comprising arranging each fiber optic cable to monitor a zone of the structure.

6. The method of claim 1, wherein the map further indicates a sensor type for each sensor.

7. The method of claim 6, wherein the sensor types include temperature sensors and strain sensors.

8. The method of claim 1, further comprising determining health of the equipment by comparing historical readings of the sensors to real-time readings of the sensors.

9. A system comprising:
a sensor array configured to be installed in a protected zone within proximity of heating equipment on a surface of an aircraft structure and in a nonprotected zone on the surface of the aircraft to monitor runback of melted ice, wherein the runback zone is a region behind the aircraft structure where melt ice will runback during flight and wherein sensors in the runback zone are connected by fiber optic cables to sensors in the protected zone;
a controller coupled to the sensor array configured to:
read signals from each sensor of the sensor array installed on a surface of a structure or equipment, wherein each sensor is a fiber optic sensor;
generate a map based on reading the signal from each sensor, wherein the map monitors the surface and a condition of the surface detected by each sensor;
determine at least one of an abnormal condition or a failure based at least in part on reading the signal from each sensor; and
adjust power control for the heating equipment based on information from sensors in the non-protected run-back zone.

10. The system of claim 9, wherein a display device displays a temperature map based on reading signals from each sensor of the sensor array.

11. The system of claim 9, wherein reading the signals from each sensor comprises reading the signal transmitted over a fiber optic cable.

12. The system of claim 11, wherein a plurality of sensors is coupled to each fiber optic cable.

13. The system of claim 9, wherein the map further indicates a sensor type for each sensor.

14. The system of claim 13, wherein the sensor types include temperature sensors and strain sensors.

15. The system of claim 9, wherein the controller is configured to determine health of the equipment by comparing historical readings of the sensors to real-time readings of the sensors.

* * * * *